Aug. 20, 1968   J. G. DRENNAN   3,397,504
METHOD OF HANDLING BEVERAGE BOTTLES
Filed Sept. 2, 1965   3 Sheets-Sheet 1
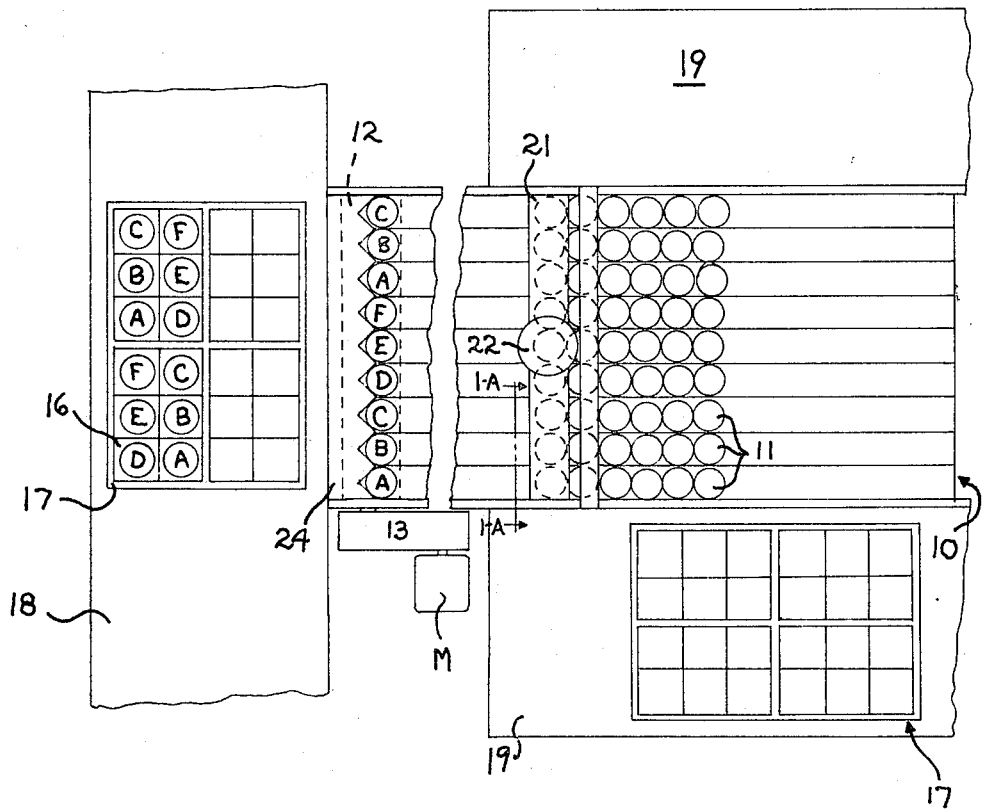
FIG. 1
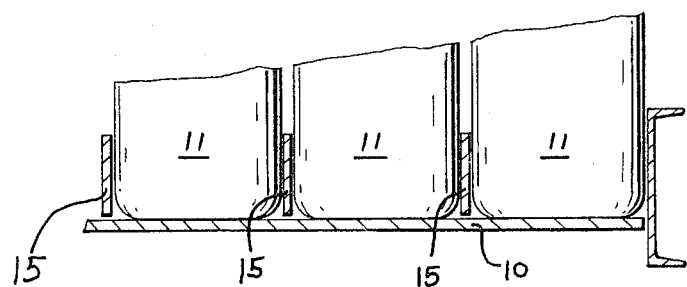
FIG. 1-A
INVENTOR.
JAMES G. DRENNAN
BY J. R. Nelson and
   W. A. Schaich
ATTORNEYS INVENTOR.
JAMES G. DRENNAN
BY J. R. Nelson and
W. A. Schaich
ATTORNEYS Aug. 20, 1968   J. G. DRENNAN   3,397,504
METHOD OF HANDLING BEVERAGE BOTTLES
Filed Sept. 2, 1965   3 Sheets-Sheet 3
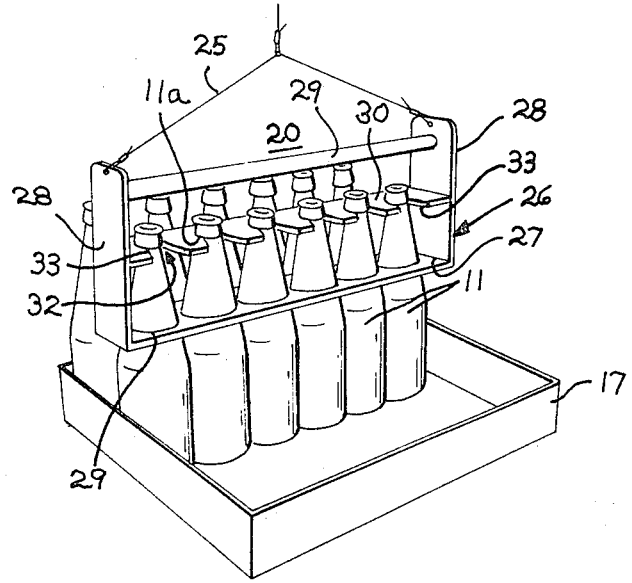
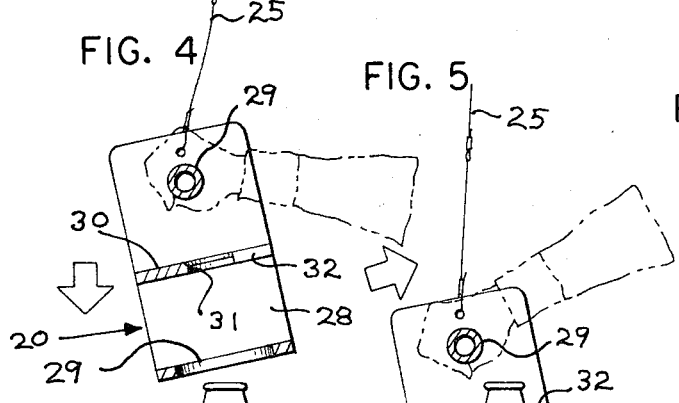
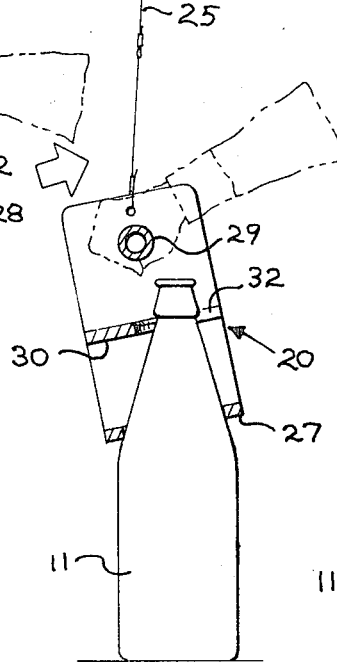
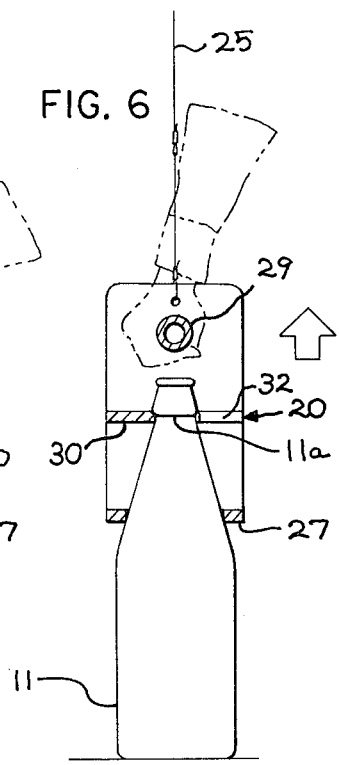
INVENTOR.
JAMES G. DRENNAN
BY J. R. Nelson and
W. A. Schaich
ATTORNEYS

United States Patent Office 3,397,504
Patented Aug. 20, 1968

3,397,504
METHOD OF HANDLING BEVERAGE BOTTLES
James G. Drennan, San Mateo, Calif., assignor to
Owens-Illinois, Inc., a corporation of Ohio
Filed Sept. 2, 1965, Ser. No. 484,678
3 Claims. (Cl. 53—26)

ABSTRACT OF THE DISCLOSURE

A procedure for placing filled beverage bottles in a six-cell "take-home" type carrier, wherein there will be a differently colored beverage in each cell, such procedure involving conveying bottles of differently colored beverage successively along each of six side-by-side lanes, segregating the lead transverse row of bottles from those following, then with a bottle gripper transferring three bottles from one end of the row and then the three bottles from the other end of the same row to the carrier.

---

My invention relates to methods of and apparatus for handling beverage bottles and more particularly is concerned with packing assorted flavors and colors of bottled soft drinks in conventional trays or paperboard "take-home" carriers, or cartons, thereby to create novel merchandise having unusuall asthetic appeal.

An important object of my invention is the provision of a method for sorting out, in semi-automatic fashion, the desired flavors and colors from a store of bottles on a multi-lane horizontal accumulator conveyor, and placing them in paper cartons, carriers, wooden cases, or trays.

Another object of my invention is the provision of a semi-automatic method of handling bottled beverages wherein bottles of an assortment of soft drinks are placed upright upon a horizontal conveyor, with a separate lane for each specific flavor and color of drink and wherein a plurality of such bottles, all different as to flavor content and color are lifted from the conveyor and deposited in cells of paper carriers, cartons, or wooden cases.

A further object of my invention is the provision of a novel method for handling bottled beverages wherein, for example, bottles of six different flavors and colors of drinks are so positioned in individual lanes of a nine-lane horizontal conveyor that through the use of a simple transfer apparatus or gripper six bottles at a time, each containing a different flavor beverage, may be removed from the conveyor and deposited in the cells of paperboard cartons, or cases.

It is also an object of my invention to provide a novel, efficient transfer apparatus for use in grasping bottles in the lanes of the accumulator conveyor and then depositing the bottles, six in number, in the cells of two side-by-side paperboard cartons of the 'take-home" carrier type.

Other objects will be in part apparent and in part pointed out hereinafter.

In the accompanying drawings forming a part of my application:

FIG. 1 is a fragmentary plan view of the conveyor system utilized in practicing my method, certain superstructure being omitted.

FIG. 1A is a sectional view taken on the line 1A—1A of FIG. 1.

FIG. 3 is a detail perspective view of the bottle transferring apparatus.

FIGS. 4, 5 and 6 are sectional elevational views illustrating the successive positions assumed by the transferring device in grasping a plurality of bottles.

Figure 2:
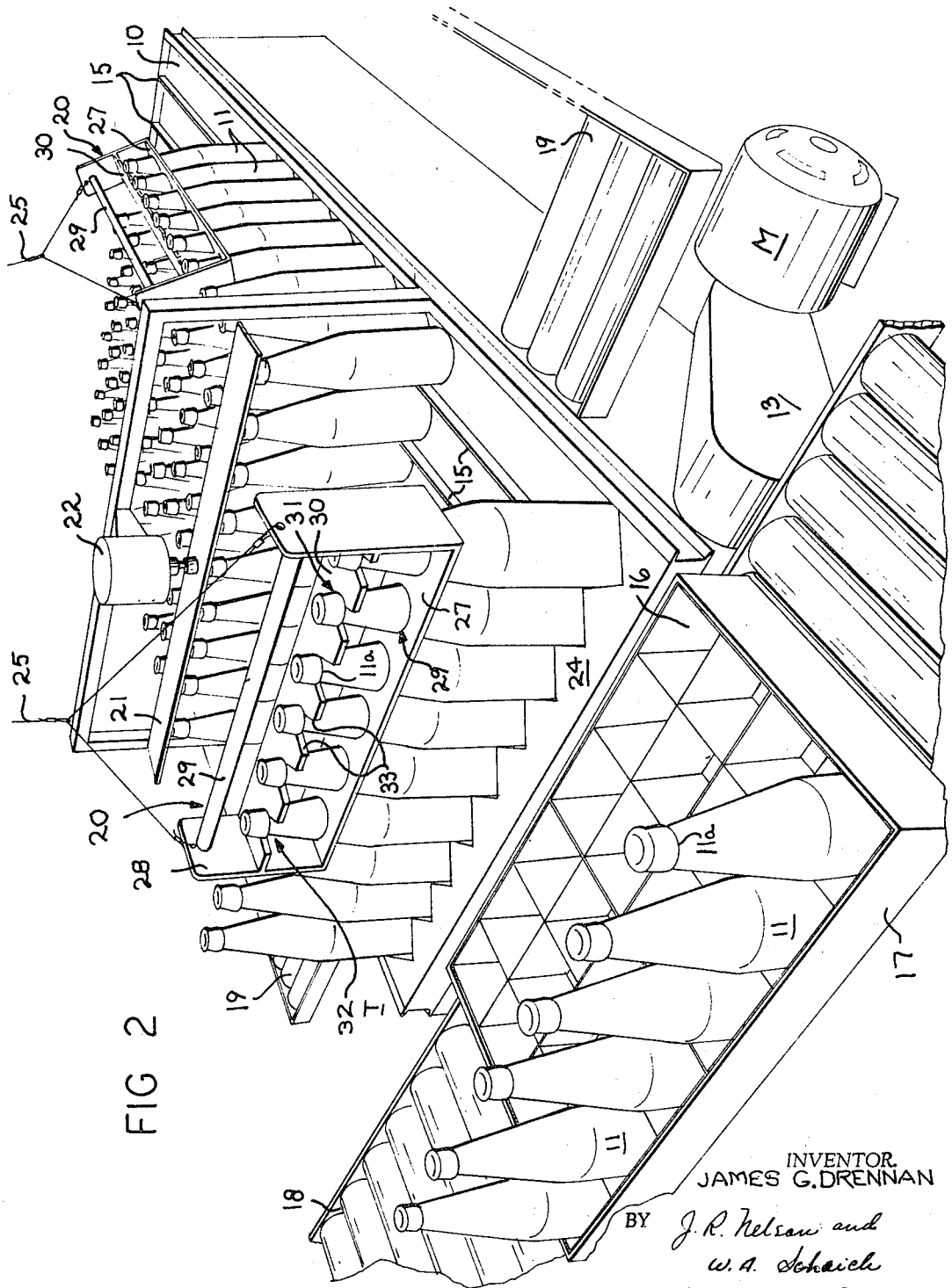
FIG. 2 is a fragmentary perspective view of the conveyor system showing also the bottle transferring means.

In the preferred embodiment of my invention, a horizontal accumulator conveyor 10 of adequate length to maintain the required volume of filled beverage bottles 11 at the transfer station T, is trained over a driven horizontal roll 12 which receives its power from a motor M through conventional transmitting means (not shown) enclosed in the housing 13. This conveyor 10 supports the beverage bottles upright in nine parallel longitudinal rows or lanes such being defined by rails 15, or the like elements. In the outermost three lanes A, B and C near each side margin of the conveyor, three flavors and colors of bottled beverages will be positioned, viz, one flavor or color in each of the lanes A, another flavor and color in lanes B and a third flavor and color in lanes C. Thus, at each side of the conveyor will be three rows of bottles, each with a different flavor and color. The group of three lanes D, E and F lying between the previously mentioned two sets of lanes A, B and C will each accommodate three different flavors and colors of bottled beverages, these also differing from the flavors in lanes A, B and C. Thus there will be a total of six flavors of beverages, so arranged across the nine lanes conveyor, that bottles in the three intermediate lanes D, E and F, together with bottles from either of the sets of lanes A, B and C will constitute a group of differently colored beverages ready for transfer to a row of six cells 16 of a tray 17, or if preferred to cells of two side-by-side paperboard bottle carriers (not shown). The trays 17 to which the filled capped bottles are transferred in groups or rows of six are supported, during loading or filling, on a skid 18, or perhaps a roller-type conveyor.

Along each side of the main conveyor 10 is a horizontal roller conveyor 19 functioning to support the trays 17 of filled beverage bottles which are transferred manually to the proper lanes, described above. An operator at each side of the main conveyor, well in advance of the transfer station T, through the use of a transfer device 20 or bottle gripper (FIGS. 3-6) removes groups of six bottles at a time from the trays and places them in the proper lane of the main conveyor 10. These trays, when empty, may be advanced to a point near the transfer station T where they can be placed on the skid 18 and be loaded with an assortment of flavors, in lieu of the single flavor which it contained while on the side roller conveyor. These trays may be replaced with conventional paperboard "take-home" bottle carriers (not shown) arranged on the skid in trays of the type illustrated so as to present rows of cells as in the tray arrangement.

As the rows of bottles advance, on the conveyor 10 their travel is interrupted by a rubber pad 21 which is carried by an air motor 22 suspended from the frame member 23. By means of any simple operator actuated control (not shown) this motor may be caused to raise and lower the pad. Thus from the accumulated volume of bottles on the conveyor, a selected number may be released in properly timed fashion and allowed to move into contact with the stop bar 24. At this point another of the transfer devices 20, or bottle grippers, picks up six of the bottles at one end or the other of the transverse row of nine and under guidance of an operator deposits them in the carton or tray cells 16. Owing to the weight of the groups of bottles being handled, I prefer utilizing a counterweight (not shown) which in obvious fashion may be secured to an end of the cable 25, shown rising from each gripper 20.

As best shown in FIGS. 3-6, each of these grippers 20, or bottle transfer devices, may well comprise an elongated U-shape frame 26, including an elongated flat base 27 and at each end an upright arm 28, the upper extremities of which are interconnected by a handle forming rod 29. The aforementioned cable 25 is connected to the upper ends of these arms 28. The base 27 is formed with a row of six equidistantly spaced apart vertical openings 29, each preferably of a diameter slightly less than the main body diameter of the bottles being handled. Thus the walls of these openings come to rest upon the tapered shoulder area of the bottles near its juncture with the body proper, when the device is in supporting engagement with a group of bottles. Just above the base 27 is a bottle finish engaging jaw member 30. This is a flat longitudinal bar parallel with the base 27 and secured at its ends to the aforementioned upright arms 28. Centrally of this jaw member 30 is a series of generally circular apertures 31 coaxial with the openings 29 in the base 27. The walls of these openings are intended to engage the lower side of the transfer bead 11a of the bottles and thus support them in the gripper 20. Inlet and exit slots or guides 32 lead to these apertures 31, such opening through one margin of the jaw member 30. These guides 32 have inwardly converging curved side walls 33 facilitating entry of the bottle necks into the jaw creating apertures 31.

In view of the foregoing it is believed evident that in practicing my method and using equipment as illustrated herein, a six-pack "take-home" paperboard carrier, for example, may be filled quite readily with six different colors and flavors of bottled beverages, thus creating a package having exceptional esthetic appeal to the consumer. To this end the operator merely first lifts six bottles from one end of the lead transverse row at the stop 24, places them in the cells of two side-by-side paperboard carriers, allows additional bottles to advance, replacing those just transferred and then lifts six bottles from the other end of the lead row. Thus it is seen that each loaded carrier will contain bottles of beverages of six different flavors and colors.

Modifications may be resorted to within the spirit and scope of the appended claims.

I claim:
1. The method which consists in advancing filled beverage bottles along parallel side-by-side lanes to a transfer station, creating parallel rows of bottles at said station extending transverse to the length of the lanes, placing a cell-type bottle tray at said station, the tray cells in one direction being less in number than the number of lanes, segregating the lead row of bottles from the following bottles, transferring as a group a portion of the row of bottles from one end thereof to a row of cells of the tray, replacing the bottles transferred from the lead row and elevating as a group from the other end of the row the same number of bottles as previously and placing them in a row of cells beside the row just filled.

2. The method defined in claim 1, wherein the bottles comprising each group contain beverages of different flavor and color.

3. The method defined in claim 1, there being nine lanes of bottles with six of those bottles from either end of a transverse row containing beverages of different color and flavor.

References Cited

UNITED STATES PATENTS

| 2,031,949 | 2/1936 | Hartman | 53—26 XR |
| 2,630,951 | 3/1953 | Slightman | 53—26 |
| 3,169,354 | 2/1965 | Bliss et al. | 53—166 XR |

FOREIGN PATENTS 974,806  11/1964  Great Britain.

WILLIAM W. DYER, JR., *Primary Examiner.*

R. J. ALVEY, *Assistant Examiner.*